United States Patent [19]
Shiba et al.

[11] Patent Number: 6,107,620
[45] Date of Patent: *Aug. 22, 2000

[54] PHOTOSENSOR USING SIDE SURFACE LIGHT

[75] Inventors: Hiroshi Shiba; Hiroshi Mano, both of Numazu; Tomoo Nagaoka, Mishima, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,476

[22] Filed: Dec. 30, 1996

[30] Foreign Application Priority Data

Jan. 9, 1996 [JP] Japan .................................. 8-001407

[51] Int. Cl.[7] .................................................. H01L 31/00
[52] U.S. Cl. ...................... 250/214 R; 250/205; 399/41; 399/64
[58] Field of Search .................. 250/205, 214 R, 250/214.1, 214 AG, 552; 372/29, 31, 38; 315/181, 182, 183, 178, 179, 180; 362/800, 355; 358/475, 474, 487; 399/38, 40, 41, 49, 53, 58, 60, 61, 62, 64

[56] References Cited

U.S. PATENT DOCUMENTS

| | | | |
|---|---|---|---|
| 4,182,977 | 1/1980 | Stricklin, Jr. .............................. | 250/205 |
| 5,132,527 | 7/1992 | Karpati ..................................... | 250/205 |
| 5,151,628 | 9/1992 | Osawa ...................................... | 250/205 |
| 5,309,177 | 5/1994 | Shoji et al. .............................. | 346/108 |
| 5,489,771 | 2/1996 | Beach et al. ............................ | 250/205 |
| 5,491,329 | 2/1996 | Urakami et al. ........................ | 250/205 |
| 5,742,873 | 4/1998 | Kubo et al. .............................. | 399/98 |

*Primary Examiner*—John R Lee
*Attorney, Agent, or Firm*—Fitzpatrick, Cella, Harper & Scinto

[57] ABSTRACT

A photosensor includes a light emitting device, a light receiving device for receiving a side beam from said light emitting device, and a light diffusing member disposed between a side surface of said light emitting device and said light receiving device.

22 Claims, 14 Drawing Sheets

PHOTOSENSOR USING SIDE SURFACE LIGHT

BACKGROUND OF THE INVENTION

1. Field of the Invention

The present invention relates to a photosensor consisting of a light emitting device and a light receiving device and, more particularly, to a photosensor used in a density sensor unit of an image recording apparatus.

2. Related Background Art

An arrangement in which light from the front surface of a light emitting device 1 is irradiated on a certain medium 10 and the reflected light from the medium is detected by a light receiving device 9 is conventionally known as a photosensor. In this arrangement, the directivity characteristic of the light from the front surface of the light emitting device is generally as shown in FIG. 1. Also, a model in which side beams from a light emitting device 1 are received and monitored by a light receiving device 2 is as shown in FIG. 2. In a conventional photosensor, the light emitting device 1 and the light receiving device 2 are often arranged in positions as shown in FIG. 2 by taking account of the influence of limitations on design and mechanical positional accuracy.

Unfortunately, when the side beams from the light emitting device 1 are monitored by the light receiving device 2 as described above, the light emitting device 1 has two point light sources, i.e., a chip and the top of a resin mold encapsulating the chip when viewed from the light receiving device 2. Accordingly, the emission outputs and the directivity characteristics of these two point light sources vary due to factors such as a temperature rise in the light emitting device chip when the chip is powered, a change in the surrounding environment, and deterioration with time.

FIG. 3 shows an example of a circuit model which causes a light emitting device 1 to emit light and light receiving devices 2 and 9 to receive the light and output electrical signals. Referring to FIG. 3, this circuit model comprises the light emitting device 1, the light receiving device 2 for receiving side beams of the light from the light emitting device 1, the light receiving device 9 for receiving front beams of the light from the light emitting device 1, a comparator 12, a reference voltage terminal 11 for supplying a reference voltage to the comparator 12, a resistor 13 for regulating the power supply amount to the light emitting device, amplifiers 14 and 17, current-voltage converting resistors 15 and 18, a side beam output voltage terminal 16 used when the side beams are converted into an electrical signal, a front beam output voltage terminal 19 used when the front beams are converted into an electrical signal, a light emission amount controller 20 for controlling the light emitting device 1 with a constant current in accordance with a reference voltage Vi, a side beam receiving unit 21, and a front beam receiving unit 22.

FIG. 4 shows variations in the side beam with the power supply amount when the light emitting device 1 is made to emit light by a constant current in the circuit model with the arrangement as shown in FIG. 3. Each parameter is obtained by varying the power supply amount by varying the reference voltage Vi. FIG. 5 shows variations in the front beam with the power supply amount when the light emitting device 1 is made to emit light by a constant current. FIG. 6 shows variations in the ratio of the side beam to the front beam when the light emitting device is made to emit light by a constant current.

As shown in FIGS. 4 to 6, the side beam tends to increase with time and the front beam tends to decrease with time upon the supply of a certain constant current. Consequently, the ratio of the side beam to the front beam is largely corrupted with time. Also, the larger the power supply amount, the larger the side beam, the front beam, and the ratio of the side beam to the front beam is further corrupted.

SUMMARY OF THE INVENTION

The present invention has been made in consideration of the above situation and has as its object to provide a photosensor in which side beams from a light emitting device are once irradiated on a light diffusing member and a light beam emitted from the surface of this light diffusing member as a light source is received by a light receiving device for monitoring, and which thereby realizes a stable reception of the monitoring light beam unaffected by changes in the emission output and the directivity characteristic of the light emitting device.

To achieve the above object, the present invention provides a photosensor comprising a light emitting device and a light receiving device, wherein the light emitting device and the light receiving device are so relatively arranged that the light receiving device receives side beams from the light emitting device, and a light diffusing member is disposed between the side surface of the light emitting device and the light receiving device.

In this photosensor, it is preferable that the light diffusing member be a plate-like member and disposed at the middle point between the light emitting device and the light receiving device or in a position closer to the light emitting device than the middle point. Also, in a position on the side of the light emitting device the light diffusing plate preferably has a length equal to at least a distance between a chip and a surface resin of the chip. In addition, in a position on the side of the light receiving device the light diffusing member preferably has a length by which a light beam emitted from the surface of the light diffusing member covers an entire sensor portion of the light receiving device.

The present invention also provides a photosensor comprising a light emitting device and a light receiving device, wherein the light emitting device and the light receiving device are so relatively arranged that the light receiving device receives side beams from the light emitting device, and a cap-like light diffusing member is so arranged as to surround an entire circumferential surface of the light emitting device.

As in the first photosensor, in a position on the side of the light emitting device the light diffusing plate preferably has a length equal to at least a distance between a chip and a surface resin of the chip. In addition, in a position on the side of the light receiving device the light diffusing member preferably has a length by which a light beam emitted from a surface of the light diffusing member covers an entire sensor portion of the light receiving device.

Accordingly, the side beams from the light emitting device are once irradiated on the light diffusing plate, and this changes point light sources from the light emitting device into a surface light source from the light diffusing plate. Consequently, the light receiving surface of the light receiving device can receive uniform light and so the light receiving device can output a stable light reception signal.

DETAILED DESCRIPTION OF THE PREFERRED EMBODIMENTS

Figure 7:
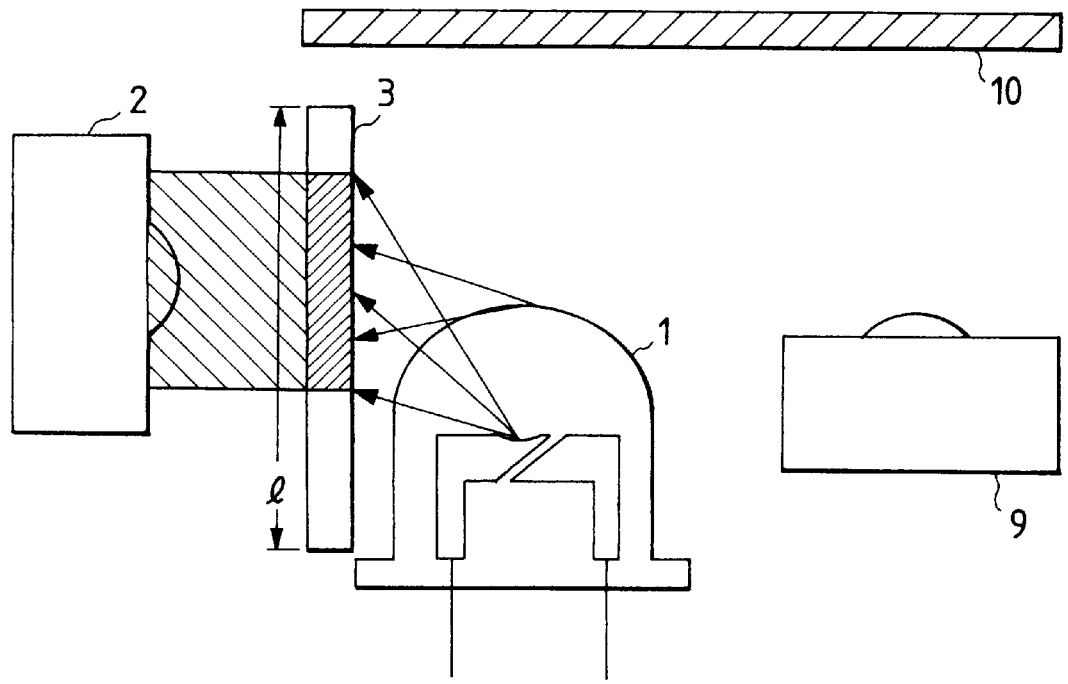
FIG. 7 is a schematic view showing the first embodiment of a photosensor of the present invention.

FIG. 7 is a view showing the first embodiment of a photosensor of the present invention. In FIG. 7, this photosensor includes a light emitting diode (LED) 1 as a light emitting device, a light receiving device 2, and a diffusing plate 3. When viewed sideways, the light emitting device 1 has two point light sources, i.e., a chip (light emitting chip) of the light emitting device and the top of a resin mold. Side beams emitted from these light sources are once irradiated on the light diffusing member (to be referred to as a diffusing plate hereinafter) 3 inserted between the light emitting device 1 and the light receiving device 2. The side beams are diffused inside the diffusing plate 3 and irradiated as a surface light source from the diffusing plate 3 onto the light receiving device 2. The photosensor further includes a light receiving device 9 for receiving front beams from the light emitting device 1 and a medium 10 on which the front beams are irradiated.

Figure 1:
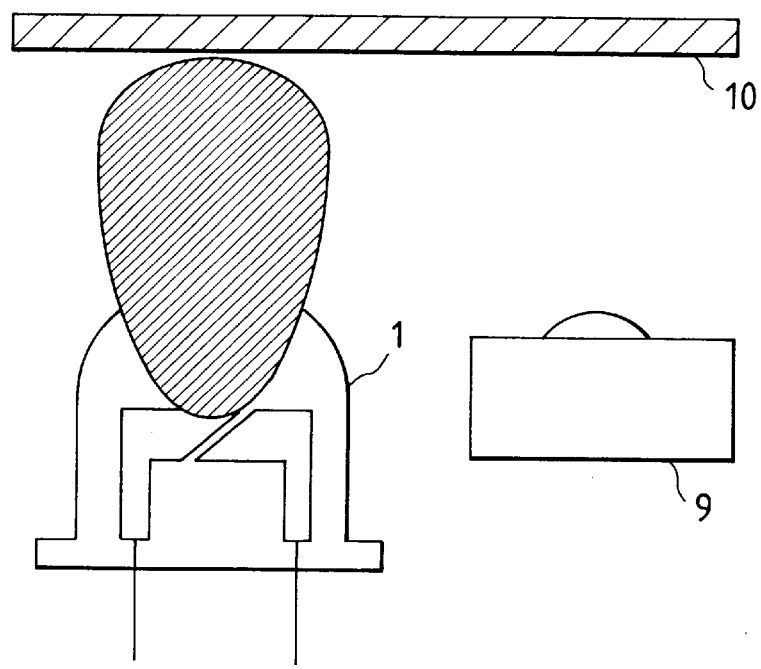
FIG. 1 is a schematic view showing the directivity characteristic of a light emitting device used in a conventional photosensor.
Figure 2:
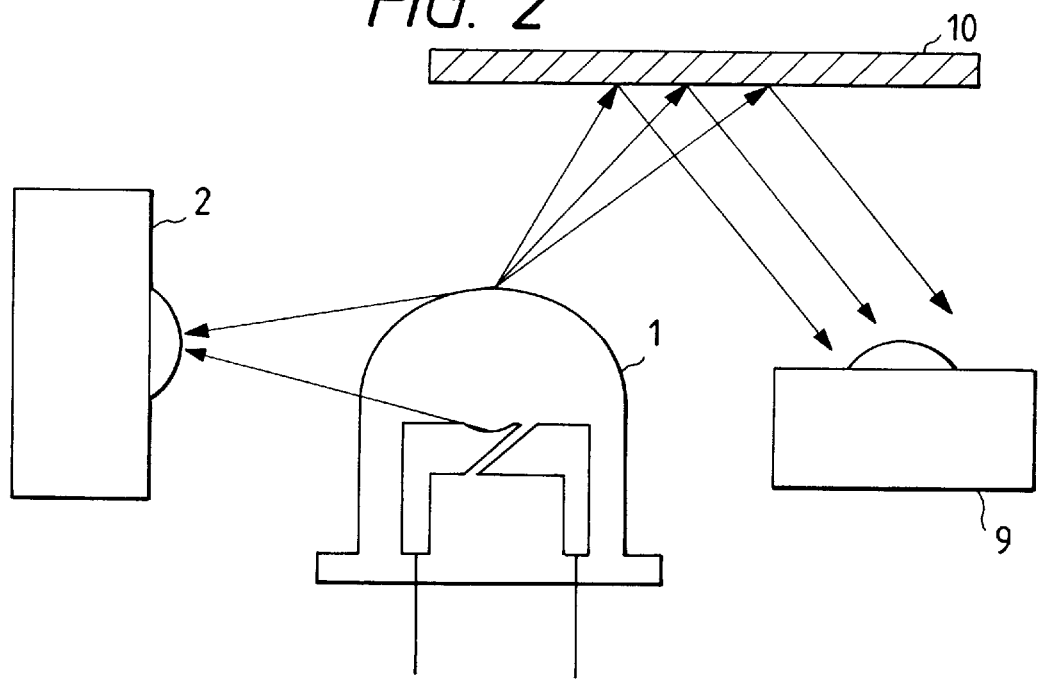
FIG. 2 is a view showing a common arrangement in which side beams from the light emitting device shown in FIG. 1 are monitored by a light receiving device.
Figure 3:
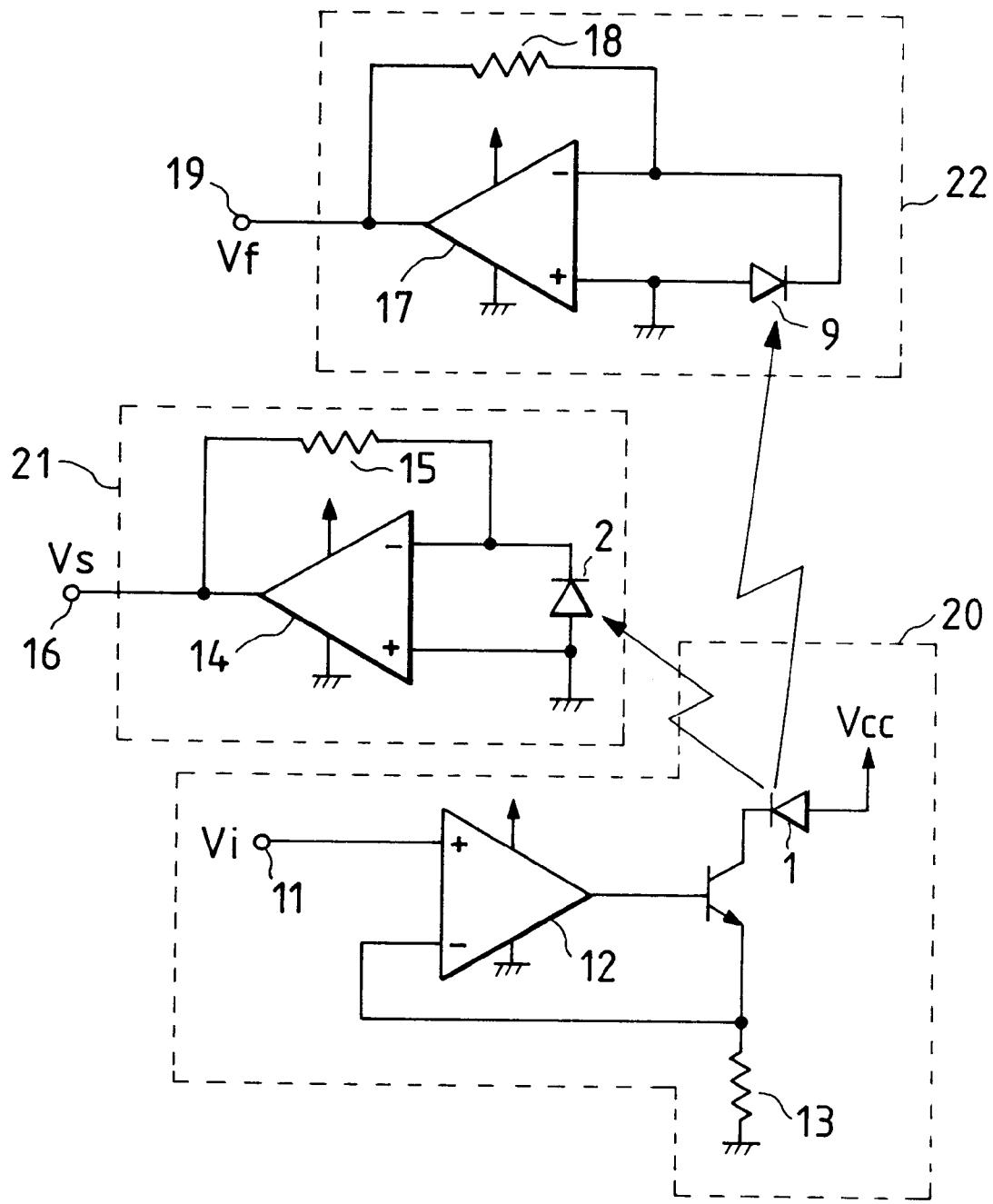
FIG. 3 is a circuit model for outputting electrical signals from the light receiving devices shown in FIG. 2.
Figure 4:
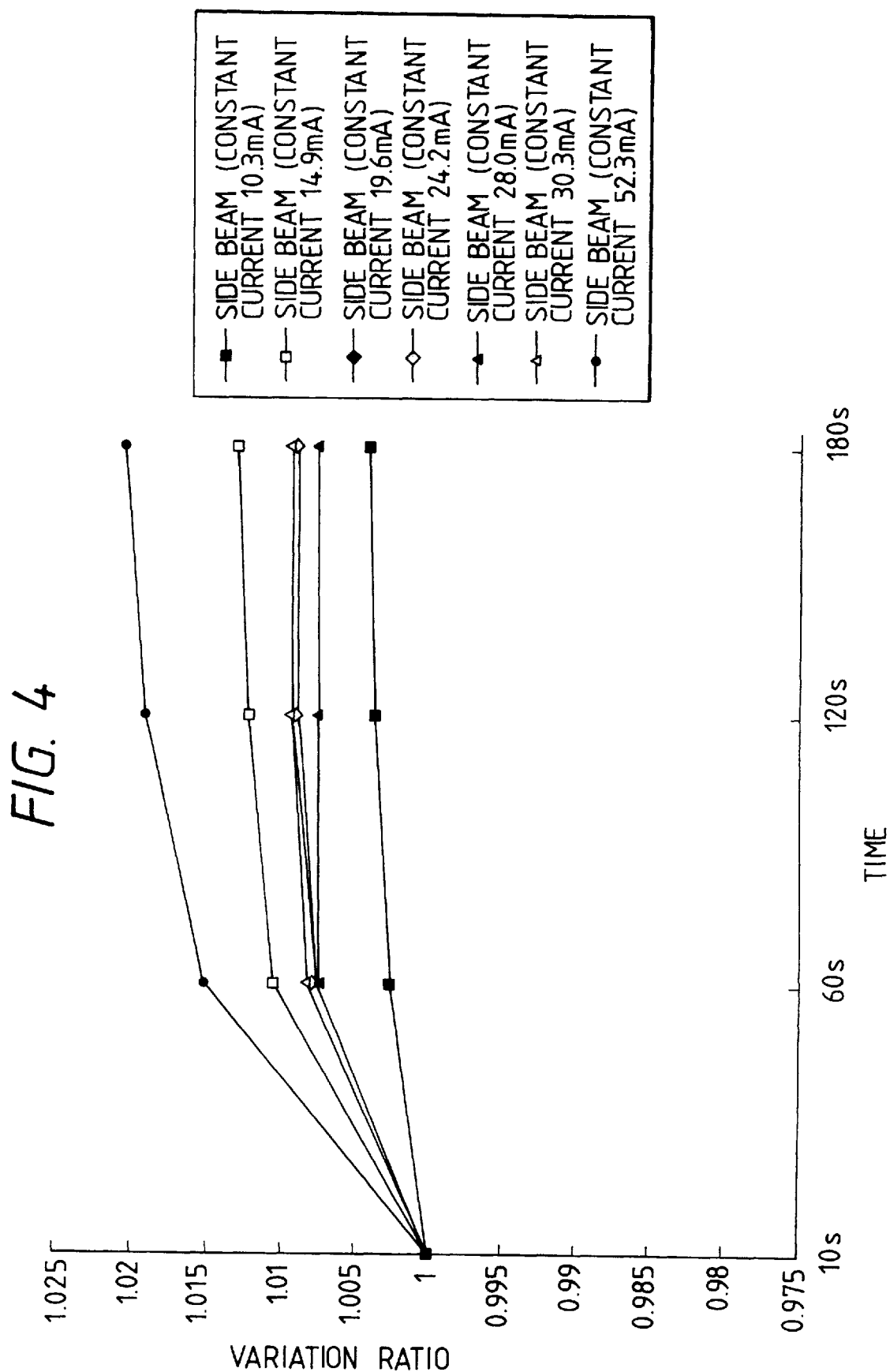
FIG. 4 is a graph showing variations in the side beam with the power supply amount when the light emitting device is made emit light by a constant current.
Figure 5:
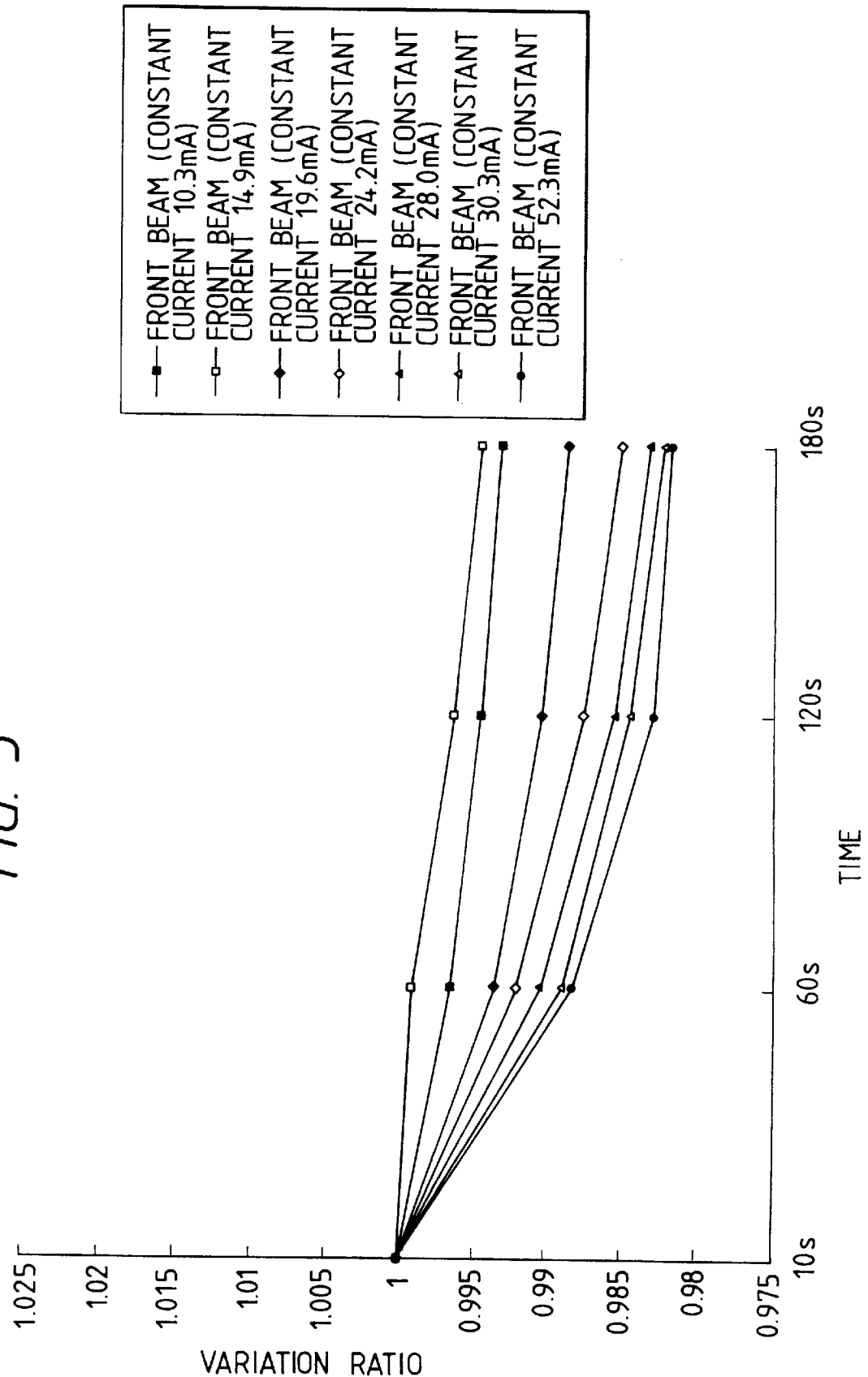
FIG. 5 is a graph showing variations in the front beam with the power supply amount when the light emitting device is made emit light by a constant current.
Figure 6:
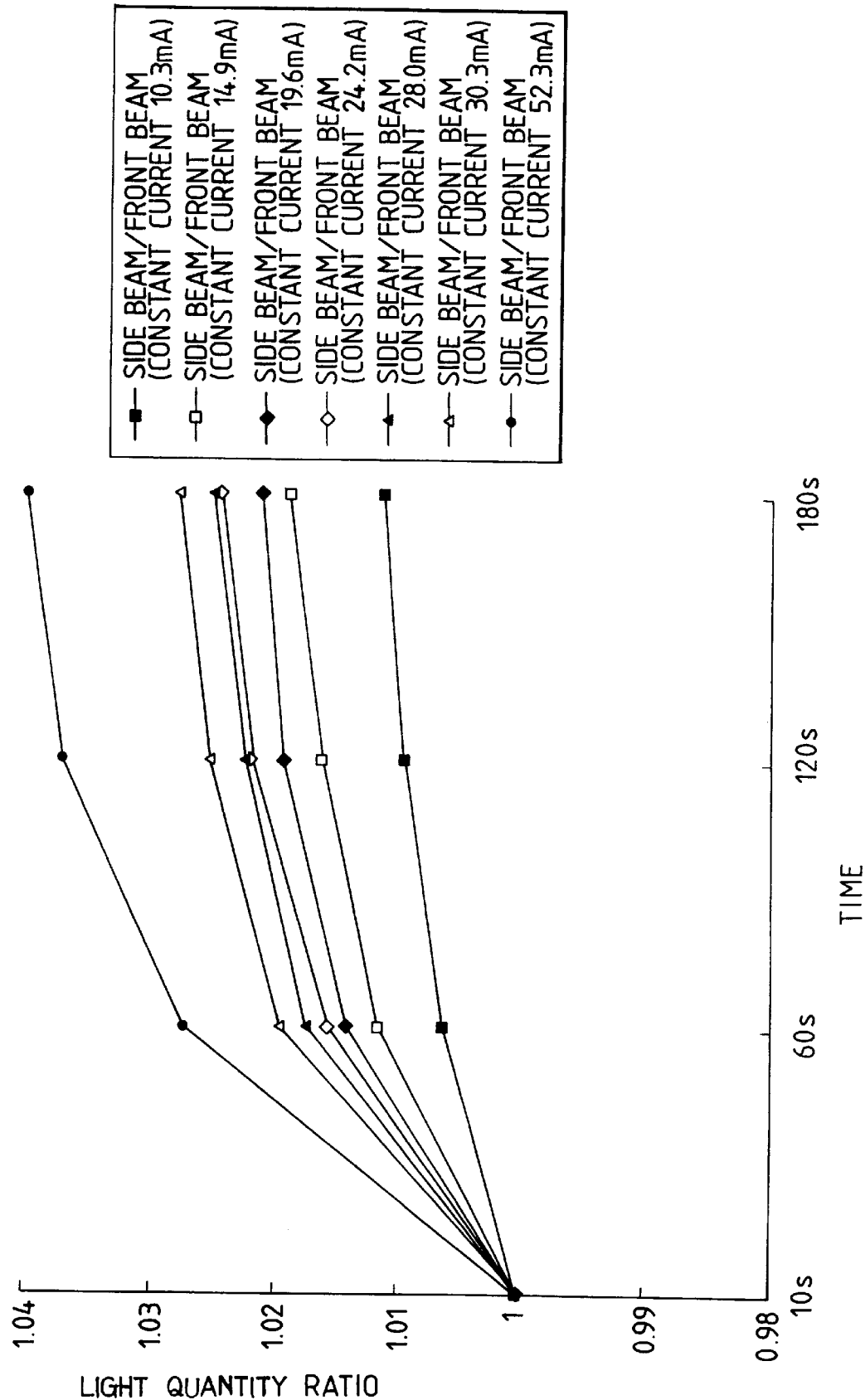
FIG. 6 is a graph showing variations in the ratio of the side beam to the front beam when the light emitting device is made emit light by a constant current.

In the photosensor with the above arrangement, the side beams from the light emitting device 1 can be received as uniform light by the light receiving device 2. Accordingly, the characteristics of the photosensor are stable with respect to changes in the emission output and the directivity characteristic, when compared to a photosensor shown in FIG. 2 in which side beams are directly irradiated on a light receiving surface.

Figure 8:
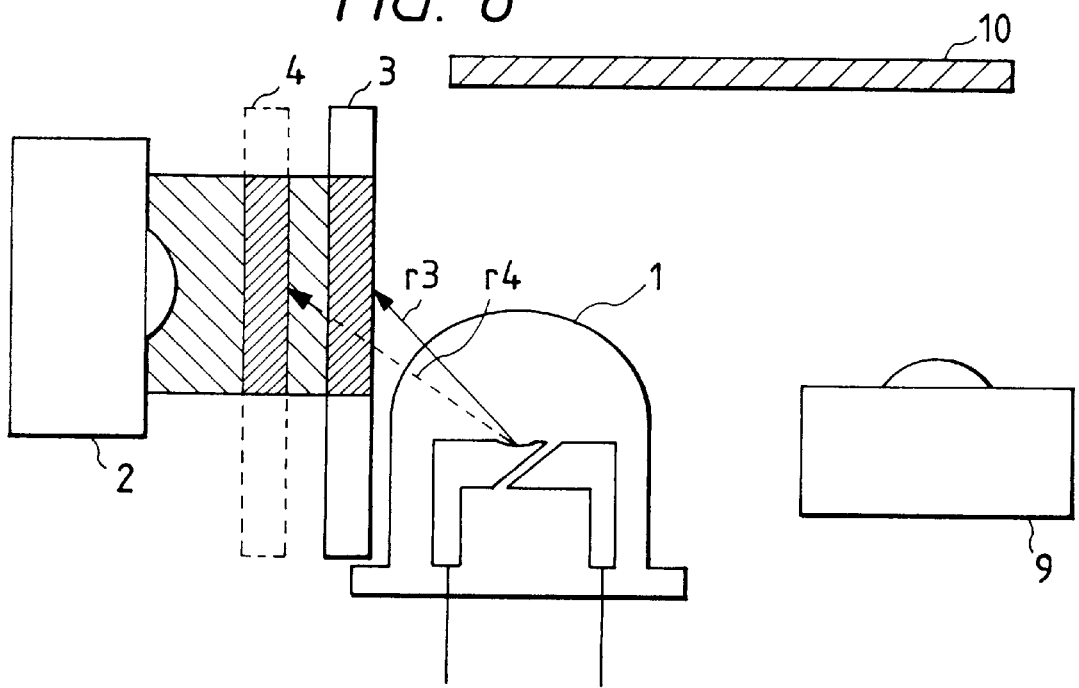
FIG. 8 is a view showing the positions of light diffusing plates.

FIG. 8 shows the positions of diffusing plates. A diffusing plate 4 is arranged at the middle point between the light emitting device 1 and the light receiving device 2. The diffusing plate 3 is arranged in a position closer to the light emitting device than the middle point. In FIG. 8, the light emitting chip and the diffusing plate 3 have a distance r3 therebetween, and the light emitting chip and the diffusing plate 4 have a distance r4 therebetween (r3<r4).

When the two diffusing plates 3 and 4 are arranged as above, the quantity of light emitted from the light emitting device 1 attenuates in proportion to the square of the distance. Consequently, the quantity of side beams received by the diffusing plate 4 is larger than the quantity of side beams received by the diffusing plate 3. That is, the light emission amount of the surface light source is larger in the position of the diffusing plate 3.

When the diffusing plate is arranged closer to the light receiving device 2 than the middle point between the light emitting device 1 and the light receiving device 2, light reaching the light receiving device 2 is intercepted by the diffusing plate and this decreases the light quantity. Therefore, if the photocurrent of the light received by the light receiving device 2 or the voltage value obtained by current-voltage conversion needs to be decreased within a desired range, it is only necessary to properly select the position of the diffusing plate.

Furthermore, a length l of the diffusing plate 3 is set to be larger than the distance between the two point light sources (the light emitting chip and the point of the resin mold) when the light emitting device 1 is viewed sideways. Consequently, the light receiving device 2 does not receive direct light from one of the two point light sources. Also, the length l of the diffusing plate 3 is so set that the diffused light is incident on the entire light receiving surface of the light receiving device 2. This prevents the incidence of unstable light on the light receiving surface.

Figure 9:
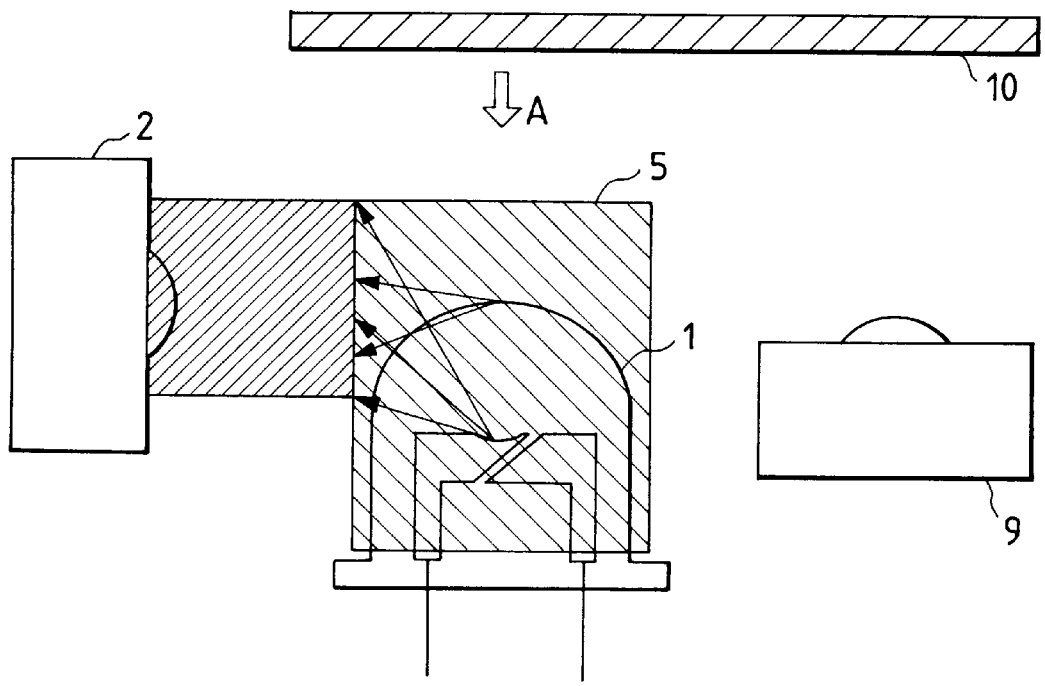
FIG. 9 is a schematic view showing the second embodiment of the photosensor of the present invention.
Figure 10:
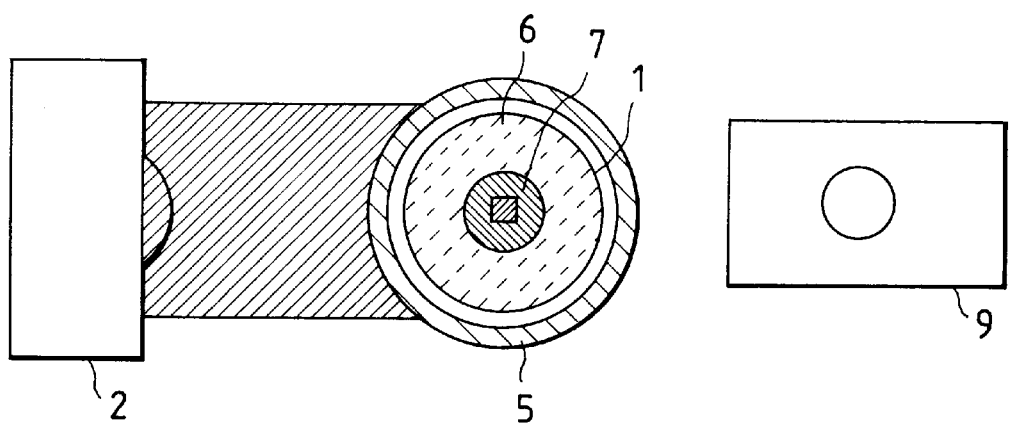
FIG. 10 is a top view of the photosensor shown in FIG. 9.

FIG. 9 is a view showing the second embodiment of the photosensor of the present invention. The same reference numerals as in FIG. 7 denote the same parts in FIG. 9 and a detailed description thereof will be omitted. This photosensor shown in FIG. 9 uses a cap-like light diffusing plate (to be referred to as a light diffusing cap hereinafter) 5 instead of the diffusing plates 3 and 4 described above. FIG. 10 is a view in which a light emitting device 1 in FIG. 9 is viewed from the above (in the direction of an arrow A). Referring to FIG. 10, the light emitting device 1 consists of a resin mold 6 and a light emitting chip 7. The entire circumferential surface of the light emitting device 1 is covered with the light diffusing member.

Side beams irradiated from the light emitting device 1 enter the light diffusing cap 5 and entirely form diffused light. This diffused light is received by a light receiving device 2 as a surface light source from the light diffusing cap 5.

In the photosensor with the above arrangement, the side beams from the light emitting device 1 can be received as uniform light by the light receiving device 2. Accordingly, the characteristics of the photosensor are stable with respect to changes in the emission output and the directivity characteristic, when compared to a photosensor in which side beams are directly irradiated on a light receiving surface. Additionally, the light diffusing cap facilitates obtaining a high positional accuracy of the light diffusing plate. Consequently, a stable side beam emission output can be obtained.

Figure 11:
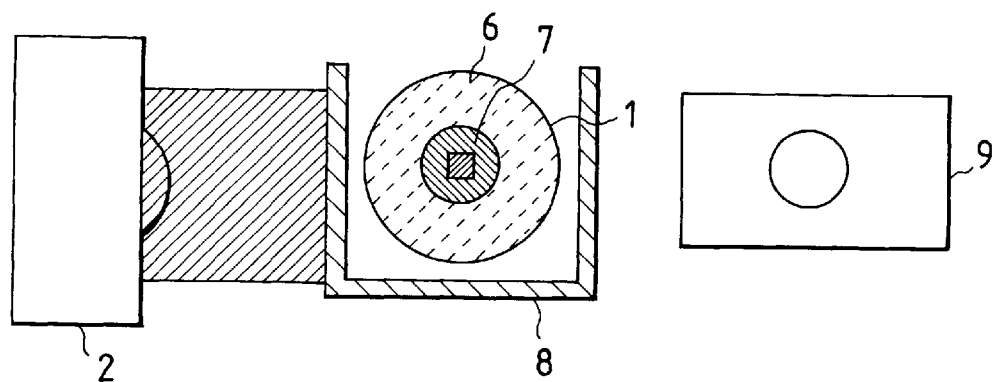
FIG. 11 is a schematic view showing still another embodiment of the present invention.

FIG. 11 shows still another embodiment of the diffusing plate. Referring to FIG. 11, a box-like diffusing member 8 is used instead of the diffusing plate or the diffusing cap described above. This diffusing member 8 is arranged close to a light emitting device 1 and given a length with which the diffusing member 8 can irradiate diffused light which can cover the dimensions of two point light sources on the side of the light emitting device 1 and the dimensions of the light receiving surface of a light receiving device 2. Consequently, an effect similar to those of the previous embodiments is obtained.

Figure 12:
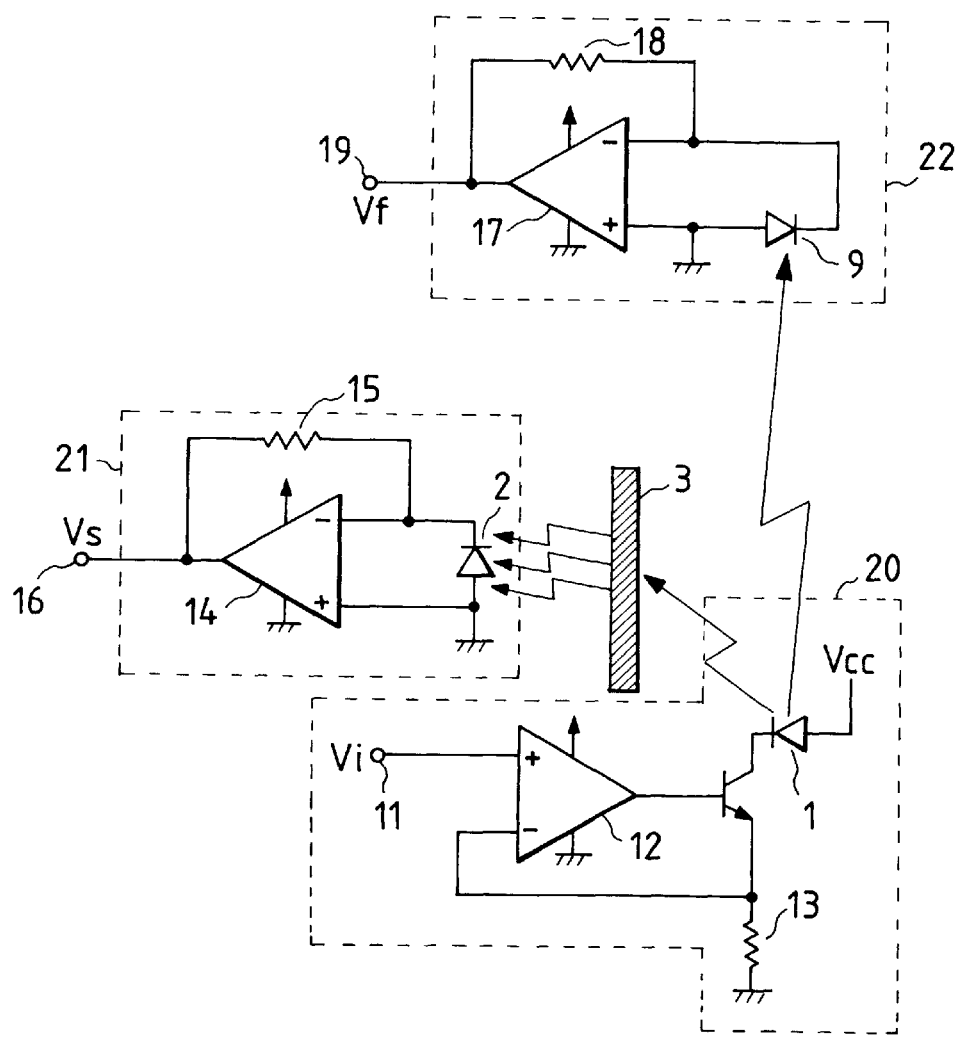
FIG. 12 is a circuit model for outputting electrical signals from the light receiving devices shown in FIG. 11.

FIG. 12 shows an example of a circuit model in which a light emitting device 1 emits light, a diffusing plate emits side beams from the light emitting device 1 from the surface of the plate, and the received light is output as an electrical signal. Referring to FIG. 12, this circuit model includes the light emitting device 1, a light receiving device 2 for receiving side beams of the light from the light emitting device 1, a light diffusing plate 3 for emitting the side beams from the light emitting device 1 from its surface, a light receiving device 9 for receiving front beams of the light from the light emitting device 1, a comparator 12, a reference voltage terminal 11 for supplying a reference voltage to the comparator 12, a resistor 13 for regulating the power supply amount to the light emitting device, amplifiers 14 and 17, current-voltage converting resistors 15 and 18, a side beam output voltage terminal 16 used when the side beams are converted into an electrical signal, a front beam output voltage terminal 19 used when the front beams are converted into an electrical signal, a light emission amount controller 20 for controlling the light emitting device 1 with a constant current in accordance with a reference voltage Vi, a side beam receiving unit 21, and a front beam receiving unit 22.

Figure 13:
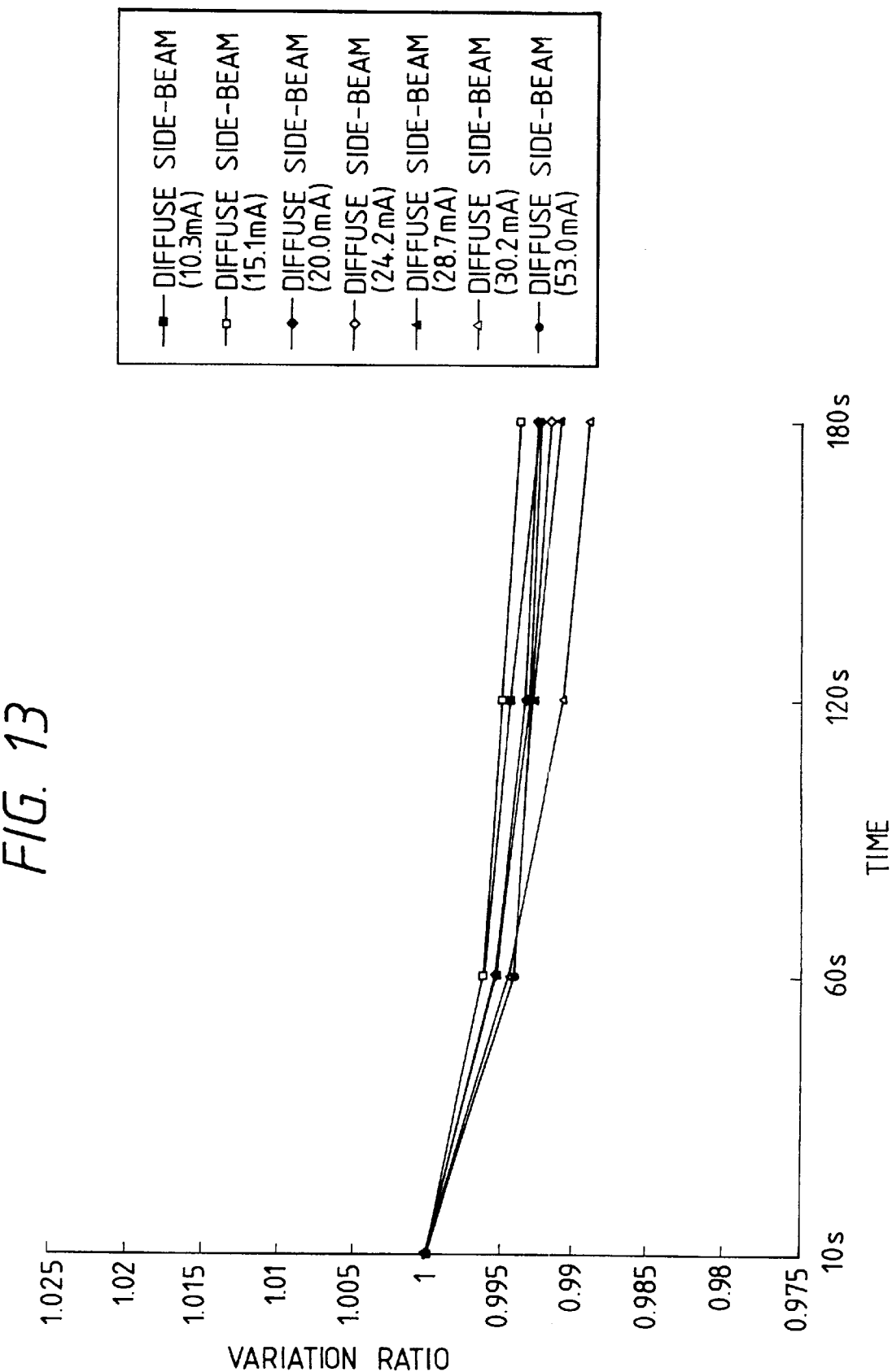
FIG. 13 is a graph showing variations in the side beam with the power supply amount when a light emitting device is made emit light by a constant current.
Figure 14:
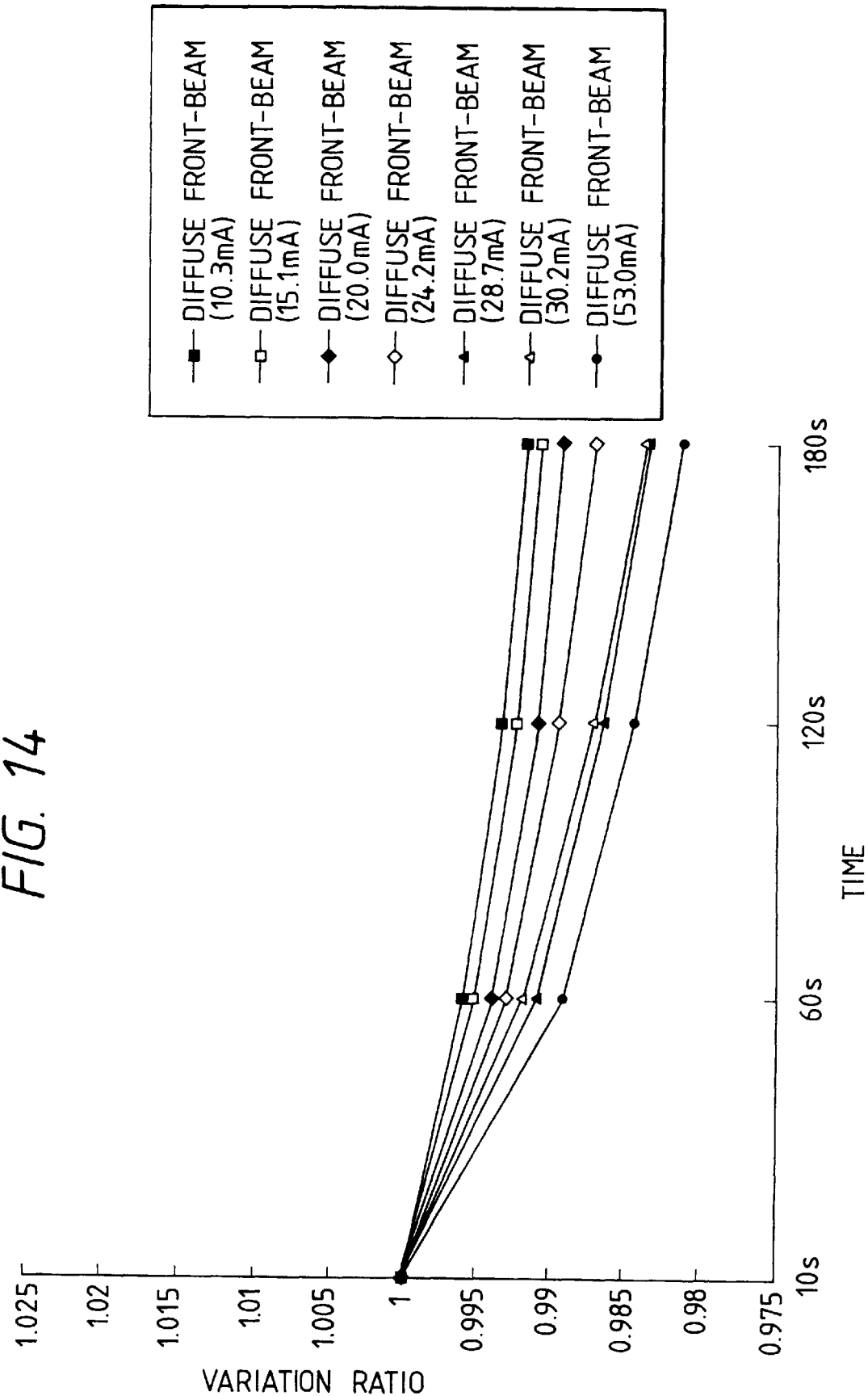
FIG. 14 is a graph showing variations in the front beam with the power supply amount when the light emitting device is made emit light by a constant current.
Figure 15:
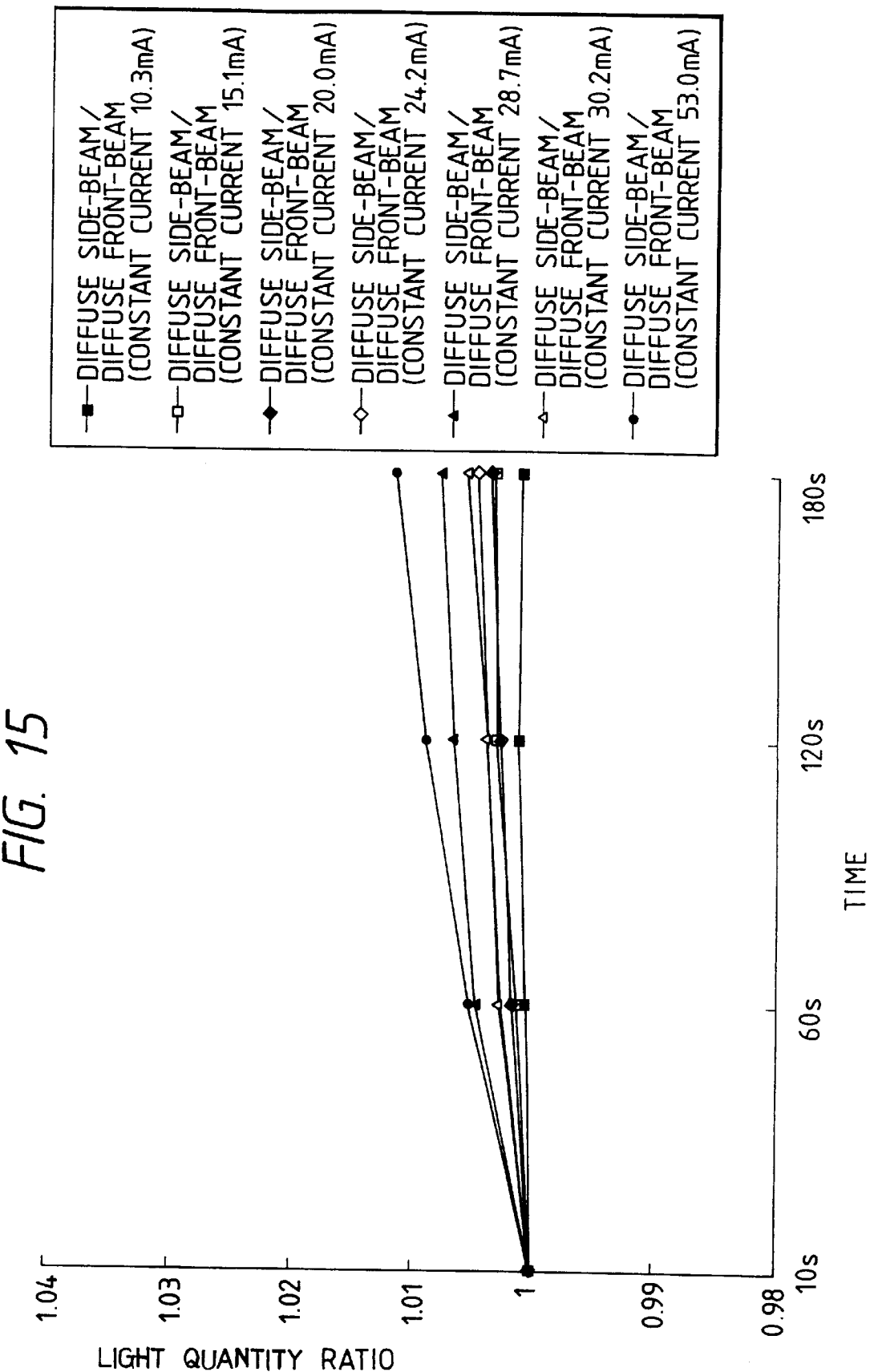
FIG. 15 is a graph showing variations in the ratio of the side beam to the front beam when the light emitting device is made emit light by a constant current.

FIG. 13 shows variations in the side beam with the power supply amount when the light emitting device 1 is made to emit light by a constant current in the circuit model with the arrangement as shown in FIG. 12. Each parameter is obtained by varying the power supply amount by varying the reference voltage Vi. FIG. 14 shows variations in the front beam with the power supply amount when the light emitting device 1 is made to emit light by a constant current. FIG. 15 shows variations in the ratio of the side beam to the front beam when the light emitting device is made emit light by a constant current.

As shown in FIGS. 13 to 15, when the diffusing plate is used the side beam tends to decrease with time and the front beam also tends to decrease with time upon the supply of a certain constant current. Consequently, changes in the ratio of the side beam to the front beam are relatively small. Accordingly, when the front beam is controlled by measuring the side beam, the difference in the control amount is small. Also, a side beam passing through the diffusing plate has a stable variation ratio regardless of the power supply amount.

When this photosensor is used in a density sensor unit of an image recording apparatus, the recording density can be detected with high accuracy.

Figure 16:
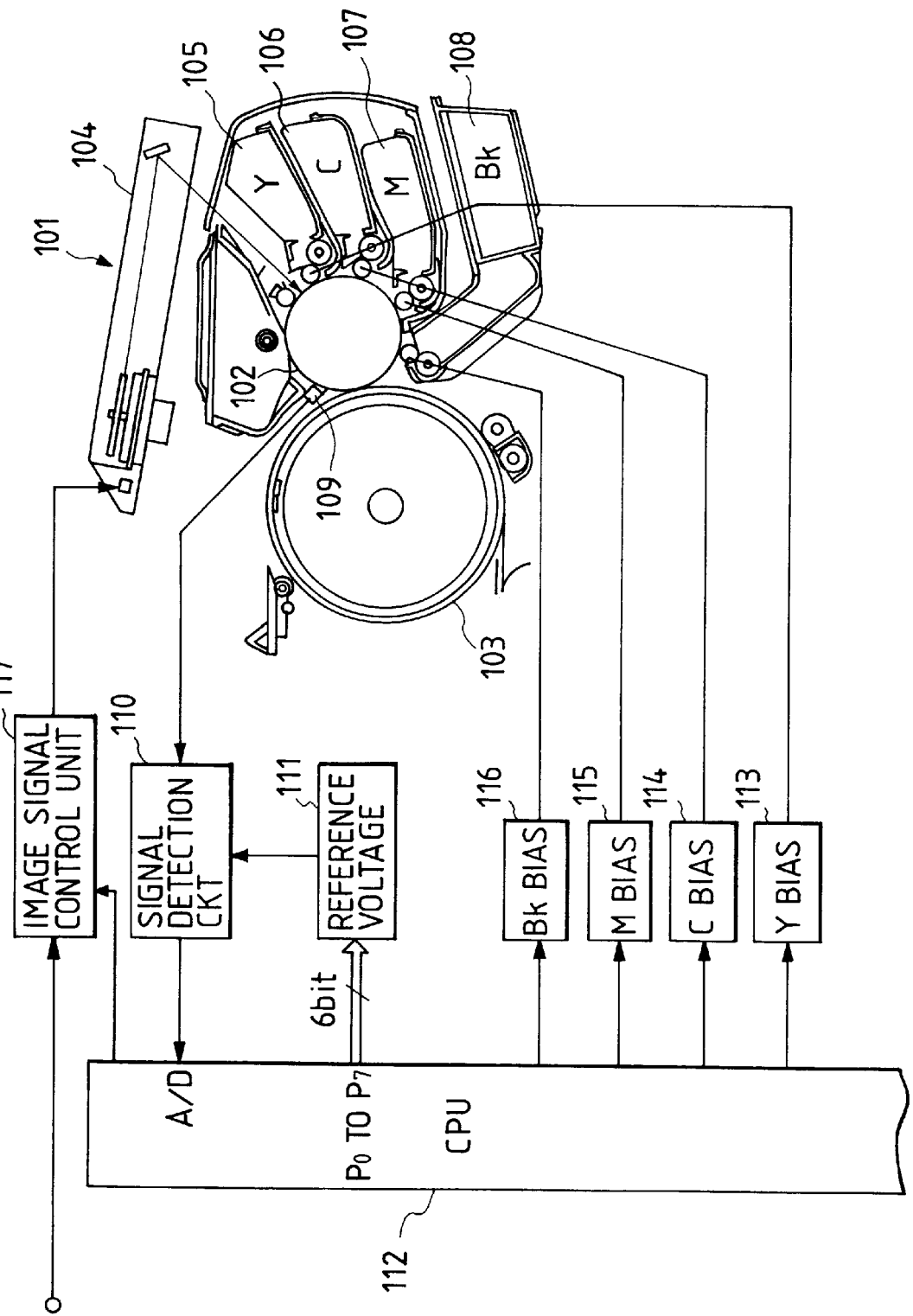
FIG. 16 is a view showing the arrangement of an image recording apparatus using the photosensor of the present invention.

FIG. 16 is a view showing the sectional arrangement of an image recording apparatus using the photosensor of the present invention and the configuration of a density controller incorporated into the apparatus.

Referring to FIG. 16, this image recording apparatus comprises an electrophotographic color image forming section 101, a photosensitive drum 102 for receiving a laser beam and forming a latent image, a transfer drum 103 for transferring an image developed from the latent image onto a recording sheet, and a laser scanning unit 104 for emitting an image signal by a laser beam.

The apparatus further comprises a yellow toner developing unit 105 for developing a yellow latent image, a cyan toner developing unit 106, a magenta toner developing unit 107, and a black toner developing unit 108. A density sensor unit 109 senses the density of an image formed on the photosensitive drum 102. A signal detection circuit 110 detects the density sensor signal from the density sensor unit 109. A reference voltage circuit 111 supplies a reference voltage to the signal detection circuit 110. A CPU (Central Processing Unit) 112 controls the entire apparatus.

Note that developing bias supplies 113, 114, 115, and 116 are provided for the yellow, cyan, magenta, and black developing units 105, 106, 107, and 108, respectively.

The operation of the image recording apparatus having the above arrangement will be described below.

In the color image forming section 101, the photosensitive drum 102 is charged by a charger (not shown), and a latent image is formed on the surface of the photosensitive drum 102 by the laser beam emitted from the laser scanning unit 104. When a yellow latent image is formed, for example, the yellow developing bias supply 113 is activated to apply a developing bias to the yellow developing unit 105, thereby visualizing the yellow latent image with toner. The visualized toner image is attracted by a high transfer voltage applied to the transfer drum 103 and transferred from the photosensitive drum 102 to the transfer drum 103.

A series of the above operations are similarly performed for each color (yellow Y, magenta M, cyan C, and black Bk) to form a color image on the transfer drum 103. Thereafter, the color image is transferred to a transfer sheet (not shown), fixed, and printed out.

As is apparent from a series of the above print sequences, the print sequences of different colors are independent of each other in the image recording apparatus. Therefore, the toner density of each color can be detected by measuring the image on the photosensitive drum 102 or on the transfer drum 103 by using the density sensor 109. By using this detection result, the recording condition (the bias in this embodiment) is controlled for each recording process. This accomplishes toner preparation by which an optimum image quality can be obtained.

In this embodiment, therefore, the toner image transferred to the photosensitive drum 102 is measured by using a reflected light quantity measuring system including the density sensor unit 109, thereby stably synthesizing the density of toner of each color.

Details of the density sensor unit according to this embodiment will be described below.

Figure 17:
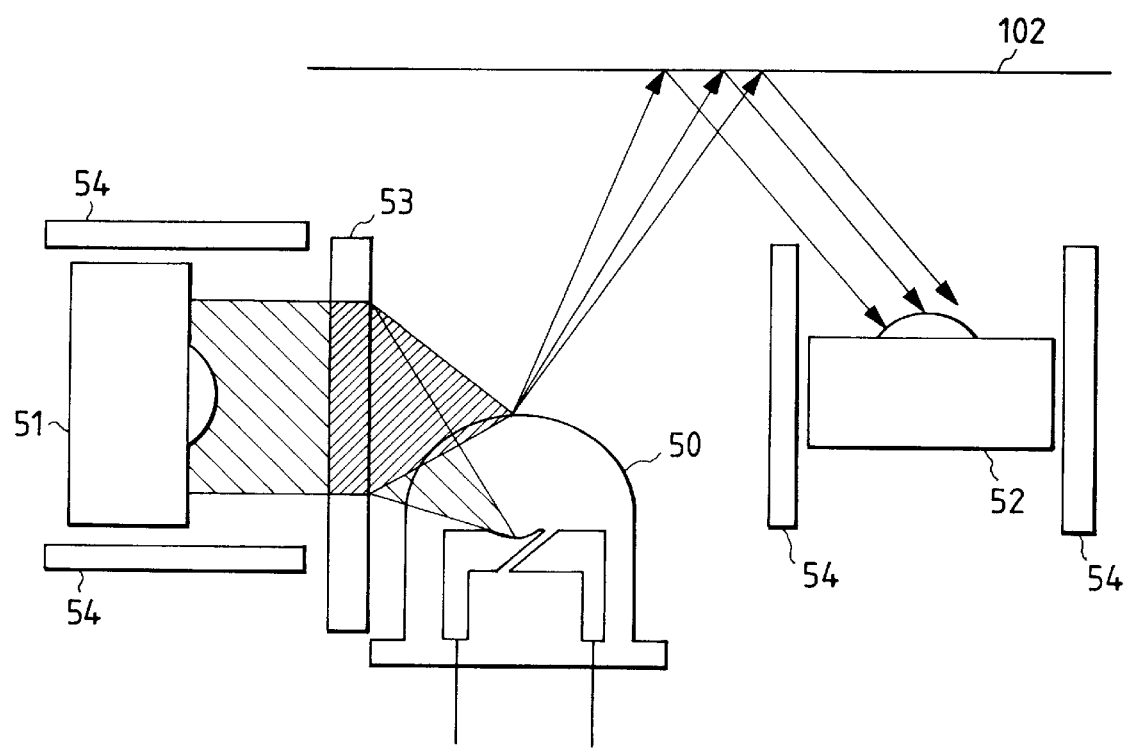
FIG. 17 is a view showing the arrangement of a reflected light detector in a density sensor unit.

FIG. 17 is a view showing the arrangement of a reflected light detector in the density sensor unit 109. Referring to FIG. 17, this detector comprises a light emitting diode (LED) 50 as a light source, a light receiving device 51 arranged near the light source 50, and a light receiving device 52 arranged in a position where it can receive a portion of light from the light source 50. This light receiving device 52 receives reflected light from the photosensitive drum 102. A light diffusing plate 53 is arranged on the side of the light source 50. A light shielding plate 54 prevents stray light from entering the light receiving devices 51 and 52.

That is, the output light from the light source 50 is irradiated on the photosensitive drum 102 and a portion of the light enters the light receiving device 51 through the light diffusing plate 53. When this partial light is irradiated on a toner image on the photosensitive drum 102, reflected (absorbed) light proportional to the density level of the toner image is produced. This reflected light reaches the light receiving device 52. In this embodiment, therefore, a basic density measurement is performed by amplifying and analyzing the level of an output detection signal from the light receiving device 52.

As shown in FIG. 16, a substrate mounting the density sensor is close to the surface of the photosensitive drum 2, and the measurement point is immediately after the position where development is performed by using a developing material. Therefore, in most cases the density sensor substrate is arranged away from a sequence control substrate mounting the CPU 112. Accordingly, in this embodiment the following points are taken into consideration as the functions required of the substrate of the density sensor 109.

1) The detection current of the light receiving device 51 is increased in order to reduce the influence of a dark current produced in the light receiving device 52 such as a pin photodiode.

2) The recording density is represented by a function (logarithm) of the value of the detection current. Therefore, by fixing the circuit gain (detection value/Δ density), the recording density is detected with a fixed accuracy (error) regardless of the density value.

3) The density sensor 109 is strongly influenced by contaminants because of its mechanical positional relationship. Therefore, the density sensor 109 is so designed as to be able to obtain a detection value even if it is contaminated.

Figure 18:
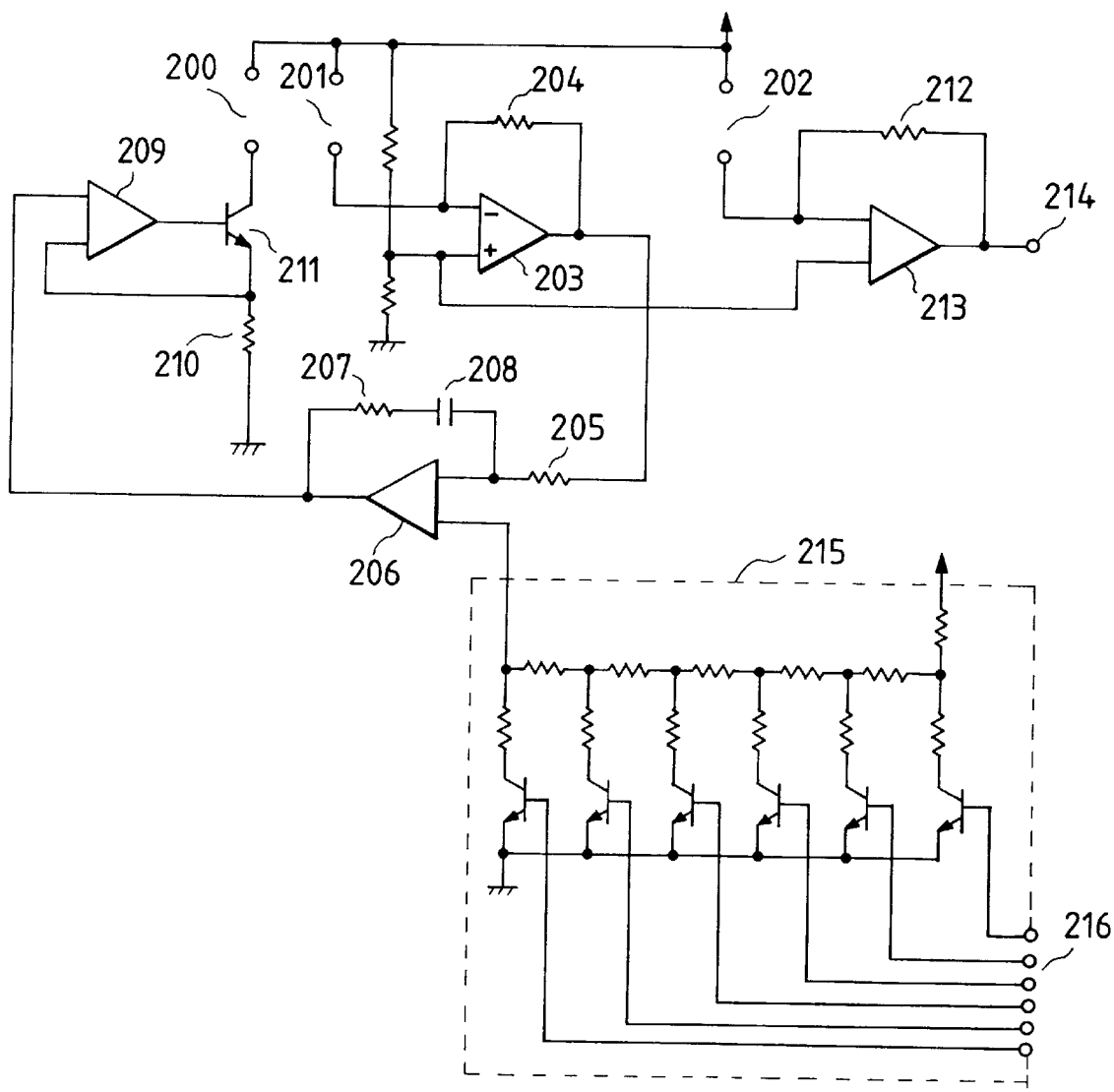
FIG. 18 is a block diagram showing the configuration of the density sensor unit.

FIG. 18 is a block diagram showing the configuration of the density sensor 109 having the above functions. Referring to FIG. 18, the density sensor 109 comprises a diode terminal 200 of the light source 50, a monitoring pin photodiode (light receiving device 51) terminal 201 of the light source 50, a reflected light measuring diode (light receiving device 52) terminal 202, and a voltage-current converting amplifier 203 which performs voltage-current conversion for an input current from the monitoring pin photodiode terminal 201 in combination with a resistor 204.

The density sensor 109 also comprises a comparison amplifier 206, a voltage-current converter 209 for receiving the output from the comparison amplifier 206 and controlling the light source current from the light source 50, an output 214 of the sensor substrate, a D/A (Digital/Analog) converter 215 consisting of a plurality of ladder resistors and switching devices, an input terminal 216 for a code signal from the CPU, resistors 205, 207, and 210, a capacitor 208, and a transistor 211.

The operation of this density sensor will be described below.

Although the three functions of the density sensor taken into consideration in this embodiment are described above, the characteristic features of these functions are as follows.

1) The light quantity of the light source is detected by controlling the light source light quantity by constantly feeding back the detection current.

2) To form the feedback unit on the sensor substrate and fix the circuit gain (detection value/Δ density), the reference voltage is externally supplied.

3) Since the input-output relationship Is constantly determined by the operation of the feedback unit, it is necessary to turn on the light only when a light source measurement is performed. This prolongs the life of the LED as the light source.

The circuit shown in FIG. 18 is so designed as to accomplish the above three items. That is, a monitoring optical current flows from the terminal 201 into the inverting input terminal of the voltage-current converting amplifier 203. The voltage-current converting amplifier 203 outputs a voltage equal to the product of the input current and the resistor 204. This voltage (monitoring optical voltage) is applied to the comparison amplifier 206 where phase correction and amplification are performed. During the processing the reference voltage terminal of the amplifier is supplied with an analog value which is D/A-converted by the D/A converter 215 on the basis of a code signal received from the sequence control substrate (not shown). Therefore, the comparison amplifier 206 outputs the result of comparison amplification using this analog value as the reference voltage value.

The result of the comparison with the reference voltage amplified and output from the comparison amplifier 206 is converted into a current by the voltage-current converter 209, thereby driving the light source current from the light source 50. By a series of the above operations, the value of the reflected light quantity is constantly made equal to the value indicated by the code signal supplied from the sequence control substrate.

A reflected light current flows from the terminal 202 and is output in the form of a voltage level by the current-voltage converter consisting of the resistor 212 and the amplifier 213. That is, the magnitude of a reflected light voltage is previously specified (a digital signal) by a code from the sequence control substrate, and the light quantity of the light source is monitored. Therefore, the detection level is an output obtained by multiplication by the reciprocal of the reflectance of the reference value (the value specified by the code). Accordingly, in particularly a portion where the reflectance is low, e.g., in black toner, a signal with a high S/N ratio can be sensed in a high-density region.

In the photosensor used in the density sensor 109, as illustrated in the arrangement in FIG. 17, the side beams from the light source 50 are monitored by the light receiving device 51, the front beams from the light source 50 are held constant by feeding back the reception signal from the light receiving device 51, and the light receiving device 52 detects the reflected light of the front beams which are thus held constant.

By arranging the light diffusing plate 53 according to the present invention on the side of the light source 50, the side beams are stabilized and fed back and thereby the front beams are stabilized. In the arrangement shown in FIG. 17, a similar effect can naturally be expected even when a light diffusing cap or a box-like diffusing member is used instead of the light diffusing plate 53.

As described above, when the photosensor of the present invention is used in a density sensor unit of an image recording apparatus, the recording density can be detected with a high accuracy.

In the present invention as has been described above, in a photosensor consisting of a light emitting device and a light receiving device, the light emitting device and the light receiving device are so relatively arranged that the light receiving device receives side beams from the light emitting device, and a light diffusing member is disposed between the side surface of the light emitting device and the light receiving device. Consequently, the side beams from the light emitting device are once irradiated on the light diffusing plate, and this changes point light sources from the light emitting device into a surface light source from the light diffusing plate. Accordingly, the light receiving surface of the light receiving device can receive uniform light and so the light receiving device can output a stable light reception signal.

Also, when the photosensor of the present invention is used in a density sensor unit of an image recording apparatus, the recording density can be detected with high accuracy.

What is claimed is:

1. A photosensor for use in a density sensor unit in an image recording apparatus comprising:

a light emitting device that generates a side beam and a front beam;

a light receiving device for receiving the side beam from said light emitting device;

a light diffusing member disposed between a side surface of said light emitting device and said light receiving device.

2. A photosensor according to claim 1, wherein said light emitting device comprises a light emitting diode.

3. A photosensor according to claim 1, wherein said light diffusing member comprises a plate-like member.

4. A photosensor according to claim 1, wherein said light diffusing member includes a light diffusing plate in a position on the side of said light emitting device and wherein said light diffusing plate has a length equal to at least a distance between a chip of the light emitting device and a surface resin of said light emitting device.

5. A photosensor according to claim 1, wherein in a position on the side of said light receiving device said light diffusing member has a length by which a light beam emitted from a surface of said light diffusing member covers an entire sensor portion of said light receiving device.

6. A photosensor according to claim 1, wherein said light diffusing member is disposed at a middle point between said light emitting device and said light receiving device or in a position closer to said light emitting device than the middle point.

7. A photosensor according to claim 1, wherein said light diffusing member comprises a cap-like member arranged so as to surround an entire circumferential surface of said light emitting device.

8. A photosensor according to claim 1, wherein said front beam is controlled by feeding back a reception signal of said light receiving device.

9. A photosensor according to claim 1, further comprising a light receiving device for receiving said front beam.

10. A photosensor according to claim 1, wherein said side beam is diffused by said light diffusing member so that light leaving the light diffusing member is irradiated onto said light receiving device as a surface light source.

11. A photosensor according to claim 1, wherein said light emitting device comprises a chip having two point light sources and, when viewed sideways, a top portion of a surface resin.

12. An image recording apparatus comprising:

(a) a density sensor unit, including:
   (i) a light emitting device, said light emitting device being adapted to generate a side beam and a front beam;
   (ii) a first light receiving device for receiving the side beam; and
   (iii) a light diffusing member disposed between a side surface portion of said light emitting device and said first light receiving device;

(b) a recording medium onto which the front beam is irradiated;

(c) a second light receiving device for receiving reflected light from said recording medium; and (d) means for forming an image onto said recording medium.

13. A apparatus according to claim 12, wherein said light diffusing member comprises a cap-like member arranged so as to surround an entire circumferential surface of said light emitting device.

14. An apparatus according to claim 12, wherein said recording medium is at least one of a photosensitive drum and transfer drum.

15. An apparatus according to claim 12, wherein the front beam is controlled by feeding back a reception signal of said first light receiving device.

16. An apparatus according to claim 12, wherein the side beam is diffused by said light diffusing member so that light leaving the light diffusing member is irradiated onto said first light receiving device as a surface light source.

17. An apparatus according to claim 12, wherein said light emitting device comprises a chip having two point light sources and, when viewed sideways, a top portion of a surface resin.

18. A apparatus according to claim 12, wherein said light emitting device comprises a light emitting diode.

19. A apparatus according to claim 12, wherein said light diffusing member comprises a plate-like member.

20. A apparatus according to claim 12, wherein said light diffusing member includes a light diffusing plate in a position on the side of said light emitting device and wherein said light diffusing plate has a length equal to at least a distance between a chip of the light emitting device and a surface resin of said light emitting device.

21. A apparatus according to claim 12, wherein in a position on the side of said first light receiving device said light diffusing member has a length by which a light beam emitted from a surface of said light diffusing member covers an entire sensor portion of said first light receiving device.

22. A apparatus according to claim 12, wherein said light diffusing member is disposed at a middle point between said light emitting device and said first light receiving device or in a position closer to said light emitting device than the middle point.

* * * * *

UNITED STATES PATENT AND TRADEMARK OFFICE
CERTIFICATE OF CORRECTION

PATENT NO. : 6,107,620
DATED : August 22, 2000
INVENTOR(S) : Hiroshi Shiba, ET AL.

It is certified that error appears in the above-identified patent and that said Letters Patent is hereby corrected as shown below:

COLUMN 4:
Line 32, "length 1" should read --length $\ell$--; and
Line 38, "length 1" should read --length $\ell$--.

COLUMN 7:
Line 62, "Is" should read --is--.

Signed and Sealed this

Twenty-ninth Day of May, 2001

Attest:

NICHOLAS P. GODICI

*Attesting Officer*   *Acting Director of the United States Patent and Trademark Office*